United States Patent
Onishi et al.

(10) Patent No.: US 6,474,108 B2
(45) Date of Patent: *Nov. 5, 2002

(54) FIBER PREFORM METHOD WITH A HOT DRILL-IN STEP FOR A GE-DOPED TUBE AND AN F-DOPED ROD

(75) Inventors: Masashi Onishi; Yoshio Yokoyama; Masaaki Hirano, all of Yokohama (JP)

(73) Assignee: Sumitomo Electric Industries, Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/402,096
(22) PCT Filed: Nov. 18, 1998
(86) PCT No.: PCT/JP98/05181
§ 371 (c)(1),
(2), (4) Date: Sep. 29, 1999
(87) PCT Pub. No.: WO99/40037
PCT Pub. Date: Aug. 12, 1999

(65) Prior Publication Data
US 2002/0124602 A1 Sep. 12, 2002

(30) Foreign Application Priority Data
Feb. 3, 1998 (JP) ............................. 10-022307
Mar. 2, 1998 (JP) ............................. 10-049472

(51) Int. Cl.[7] ............................................ C03B 37/027
(52) U.S. Cl. ............................. 65/397; 65/412; 65/112; 65/404
(58) Field of Search ...................... 65/412, 397, 398, 65/421, 112, 404

(56) References Cited

U.S. PATENT DOCUMENTS

| | | | | | |
|---|---|---|---|---|---|
| RE28,029 E | * | 6/1974 | Keck | ............... | 65/421 |
| 4,082,420 A | * | 4/1978 | Shiraishi | ............... | 65/397 |
| 4,737,179 A | * | 4/1988 | Tanaka | | |
| 4,759,604 A | * | 7/1988 | Utsumi | | |
| 4,793,842 A | * | 12/1988 | Yokota | ............... | 65/397 |
| 4,962,995 A | | 10/1990 | Andrews et al. | | |
| 4,975,102 A | * | 12/1990 | Edahiro | ............... | 65/397 |
| 5,013,131 A | * | 5/1991 | Fotheringham | ............... | 65/398 |
| 5,158,587 A | * | 10/1992 | Kyoto | ............... | 65/398 |
| 5,681,365 A | * | 10/1997 | Gilliland | ............... | 65/398 |
| 5,702,497 A | * | 12/1997 | Oh | ............... | 65/412 |
| 6,062,046 A | * | 5/2000 | Terasawa | ............... | 65/412 |
| 6,189,342 B1 | * | 2/2001 | Berkey | ............... | 65/412 |

FOREIGN PATENT DOCUMENTS

| | | | |
|---|---|---|---|
| EP | 0 249 230 A1 | | 12/1986 |
| EP | 598349 | * | 5/1994 |
| EP | 718244 | * | 6/1996 |
| JP | 2-180727 | * | 7/1990 |
| JP | 5-058662 | * | 3/1993 |
| JP | 2798465 | * | 7/1998 |

* cited by examiner

Primary Examiner—John Hoffmann
(74) Attorney, Agent, or Firm—McDermott, Will & Emery

(57) ABSTRACT

A tube-shaped, $GeO_2$-doped silica glass pipe having a high refractive index is prepared (step S2), a cylindrical silica glass rod doped with F element is inserted inside the $GeO_2$-doped silica glass pipe (step S3), and the $GeO_2$-doped silica glass pipe and silica glass rod in thus inserted state are heated so as to be unified (step S4). Further, thus formed assembly is inserted inside the a pure silica glass pipe (step S5), and they are heated so as to be unified (step S6), whereby an optical fiber preform is manufactured.

2 Claims, 13 Drawing Sheets

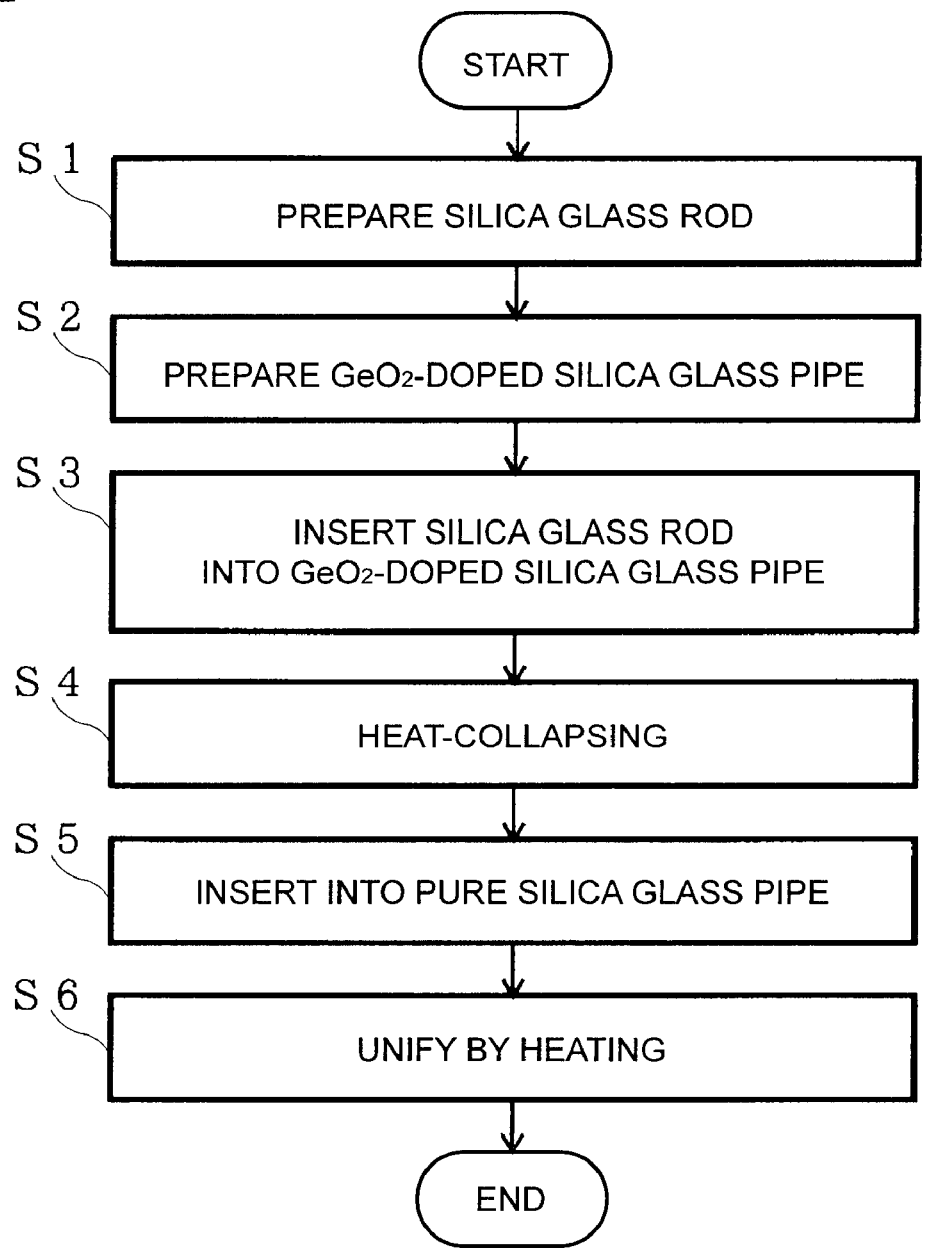

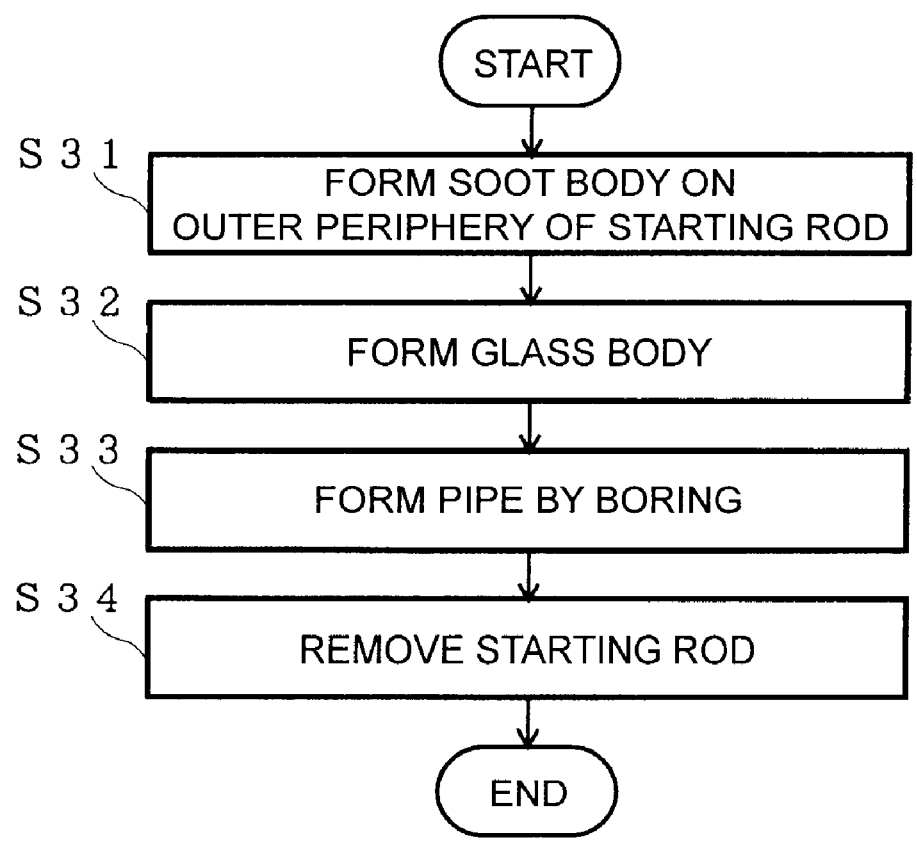

FIBER PREFORM METHOD WITH A HOT DRILL-IN STEP FOR A GE-DOPED TUBE AND AN F-DOPED ROD

TECHNICAL FIELD

The present invention relates to a method of making an optical fiber preform from which an optical fiber can be obtained by drawing.

BACKGROUND ART

Dispersion-shifted optical fibers have a zero-dispersion wavelength, where the wavelength dispersion value becomes zero, in the vicinity of 1.55 µm; one kind of which has a ring core region with a high refractive index disposed around a center core region, and a cladding region disposed around the ring core region. A dispersion-shifted optical fiber having such a refractive index profile of a ring type structure is manufactured by drawing an optical fiber preform having a similar refractive index profile.

Such a refractive index profile of an optical fiber preform can be realized by the center core portion made of silica glass which is to become the center core region of the optical fiber and the ring core portion made of silica glass including $GeO_2$ (germanium dioxide) which is to become the ring core region of the optical fiber. In general, the optical fiber preform is manufactured by VAD (vapour-phase axial deposition) method, OVD (outside vapour deposition) method, or the like.

DISCLOSURE OF THE INVENTION

When the optical fiber preform having the above-mentioned refractive index profile is manufactured by VAD method or OVD method, while gases for doping F element such as $CF_4$ gas, $SiF_4$ gas, and the like are introduced so as to add F element to the center core portion, F element is also doped in the ring core portion. If F element is doped in the ring core portion which should have a high refractive index, the overall refractive index will decrease, so that a desirable refractive index profile cannot be attained, whereby desirable fiber characteristics cannot be obtained. If the $GeO_2$ concentration in the ring core portion is enhanced as measures against this problem, the transmission loss in the optical fiber will increase, and nonlinear optical phenomena will be more likely to occur.

In order to eliminate the foregoing problems, it is an object of the present invention to provide a method of making an optical fiber preform which can favorably make an optical fiber preform having a refractive index profile of a ring type structure whose center core portion is doped with F element.

The optical fiber making method in accordance with the present invention comprises: (1) an insertion step of inserting a silica glass rod having a cylindrical form doped with F element inside a tubular silica glass pipe including a region with a refractive index greater than that of pure silica glass; and (2) a heat-collapsing step of heating and collapsing the silica glass pipe and silica glass rod which are brought into an inserted state by the insertion step.

According to this optical fiber making method, while a desirable amount of F element is doped in the silica glass rod which is to become the center core region having a low refractive index in the optical fiber, no F element is doped in the silica glass pipe which is to become the ring core region having a high refractive index in the optical fiber, whereby an optical fiber preform having a refractive index profile of a desirable ring type structure can easily be manufactured.

Preferable as the silica glass pipe in the optical fiber making method in accordance with the present invention is one prepared by: (a) a soot body synthesizing step of synthesizing a soot body of $GeO_2$ and $SiO_2$ on an outer peripheral surface of a starting pipe; (b) a transparent glass forming step of dehydrating and consolidating the soot body on the outer peripheral surface of the starting pipe so as to form a transparent glass body; and (c) a removing step of removing the portion of the starting pipe in the transparent glass body so as to prepare the silica glass pipe. Alternatively, preferable is the silica glass pipe prepared by: (a) a soot body synthesizing step of synthesizing a rod-shaped soot body of $GeO_2$ and $SiO_2$; (b) a transparent glass forming step of dehydrating and consolidating the soot body so as to form a transparent glass body; and (c) boring step of boring the transparent glass body along a center axis thereof so as to prepare the silica glass pipe. Also, preferable is the silica glass pipe prepared by: (a) a soot body synthesizing step of synthesizing a soot body of $GeO_2$ and $SiO_2$ on an outer peripheral surface of a starting rod; (b) a transparent glass forming step of dehydrating and consolidating the soot body so as to form a transparent glass body; and (c) a removing step of removing the portion of the starting rod in the transparent glass body so as to prepare the silica glass pipe. Further, preferable is the silica glass pipe prepared by: (a) a soot body synthesizing step of synthesizing a rod-shaped soot body of $GeO_2$ and $SiO_2$; (b) a transparent glass forming step of dehydrating and consolidating the soot body so as to form a transparent glass body; and (c) a pipe forming step of heating the transparent glass body to a softening temperature or higher and inserting a rod having a melting point higher than the softening temperature into the transparent glass body along the center axis thereof so as to prepare the silica glass pipe. According to any of these preparing methods, a silica glass pipe, doped with $GeO_2$, having a refractive index higher than that of pure silica glass is prepared.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 2 is a flowchart for explaining a preferred embodiment of the optical fiber preform making method in accordance with the present invention;

FIG. 8 is a flowchart for explaining a third embodiment of the method of preparing a silica glass pipe;

BEST MODES FOR CARRYING OUT THE INVENTION

Figure 1:
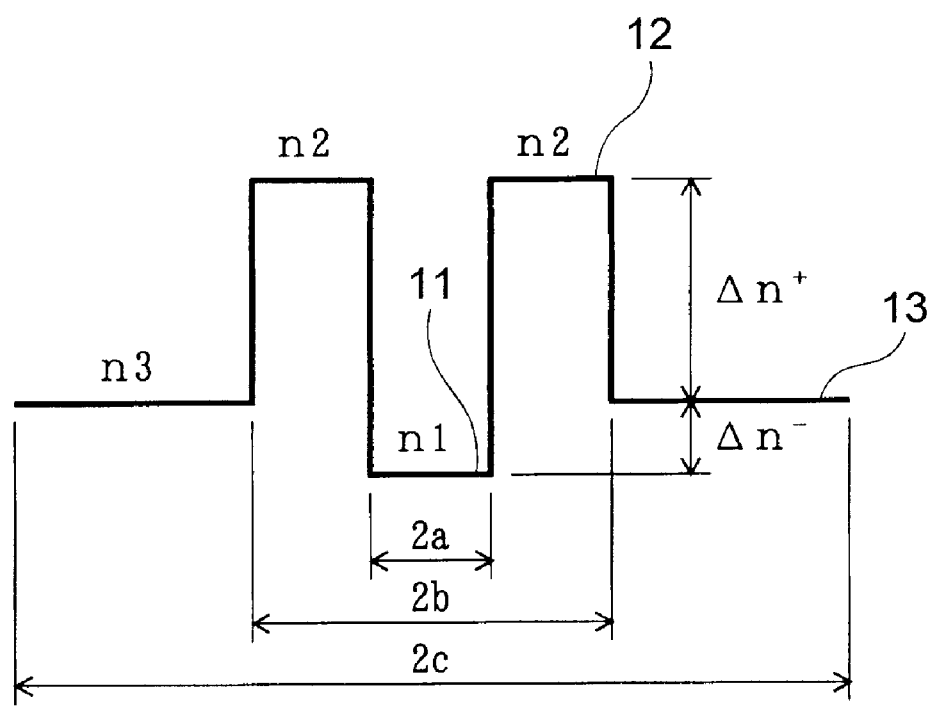
FIG. 1 is a view for explaining the refractive index profile of an optical fiber obtained by drawing an optical fiber preform which is favorably manufactured by the optical fiber preform making method in accordance with the present invention.

In the following, embodiments of the present invention will be explained in detail with reference to the accompanying drawings. To facilitate the comprehension of the explanation, the same reference numerals denote the same parts, where possible, throughout the drawings, and a repeated explanation will be omitted.

To begin with, an optical fiber obtained by drawing an optical fiber preform manufactured by the optical fiber preform making method in accordance with the present invention will be explained. FIG. 1 is a view for explaining the refractive index profile of this optical fiber. The refractive index profile indicates the refractive index distribution in a direction of a transverse cross section orthogonal to the optical axis of the optical fiber.

The optical fiber shown in this figure has a center core region 11 (with an outside diameter 2a) having a refractive index n1 at a center area including the optical axis, a ring core region 12 (with an outside diameter 2b) having a refractive index n2 therearound, and a cladding region 13 (with an outside diameter 2c) having a refractive index n3 therearound. The refractive index n2 of the ring core region 12 is greater than each of the refractive index n1 of the center core region 11 and the refractive index n3 of the cladding region 13. The outside diameter 2a of the center core region 11 is several $\mu$m, the outside diameter 2b of the ring core region 12 is on the order of several $\mu$m to 10 $\mu$m, and the outside diameter 2c of the cladding region 13 is usually 125 $\mu$m. On the other hand, the relative refractive index difference of the center core region 11, $\Delta n^-=(n1-n3)/n3$, with reference to the refractive index n3 of the cladding region 13 is within the range of −1% to 0%; whereas the relative refractive index difference of the ring core region 12, $\Delta n^+=(n2-n3)/n3$, similarly with reference to the refractive index n3 of the cladding region 13 is on the order of 0.2% to 1.5%. An optical fiber preform from which an optical fiber having such a refractive index profile is prepared by drawing also has a refractive index profile similar thereto.

A preferred embodiment of the optical fiber preform making method in accordance with the present invention will now be explained with reference to FIGS. 2 and 3A to 3F. FIG. 2 is a flowchart for explaining the optical fiber preform making method in accordance with this embodiment. FIGS. 3A to 3F are sectional views of a silica glass pipe 20 and a silica glass rod 10, which are a starting material or intermediate product of the optical fiber preform, at the respective times when the individual steps of the optical fiber preform making method in accordance with this embodiment are terminated.

Figure 3A:
FIGS. 3A to 3F are transverse sectional views of the silica glass pipe and silica glass rod at the respective times when the individual steps in FIG. 2 are terminated.

Initially, at step S1, a silica glass rod 10 such as the one shown in FIG. 3A is prepared. This silica glass rod 10 is to become the center core region 11 with a low refractive index in the optical fiber having the refractive index profile shown in FIG. 1, and is, for example, shaped like a cylinder having a diameter of about 40 mm and a length of about 300 mm, mainly composed of $SiO_2$ glass, and doped with F element. Its F element concentration is on the order of 0.1 wt % to 2 wt %. This silica glass rod 10 is manufactured, for example, by preparing a soot body of $SiO_2$ by known VAD method, and then dehydrating and consolidating this soot body in an atmosphere of a mixed gas composed of $SiF_4$, $Cl_2$, He, and the like so as to form transparent glass. Doping with F element can cause the silica glass rod 10 to have a refractive index lower than that of pure $SiO_2$ glass. The following table summarizes differences caused by F element concentrations in the relative refractive index difference $\Delta n_r=(n_r-n_{st})/n_{st}$ of the silica glass rod 10 with reference to pure $SiO_2$ glass, where the refractive index of pure $SiO_2$ glass is $n_{st}$ and the refractive index of the silica glass rod 10 is $n_r$.

| F element | Relative refractive index difference $\Delta n_r$ |
|---|---|
| 0.6 wt % | −0.2% |
| 1.1 wt % | −0.4% |
| 1.4 wt % | −0.5% |
| 2.0 wt % | −0.7% |

Figure 3B:
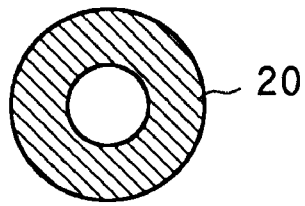

Also, at step S2, a silica glass pipe 20 such as the one shown in FIG. 3B is prepared. This silica glass pipe 20 is to become the ring core region 12 with a high refractive index in the optical fiber having the refractive index profile shown in FIG. 1, and is, for example, shaped like a tube having an inside diameter of about 10 mm, an outside diameter of about 24 mm, and a length of about 300 mm, mainly composed of $SiO_2$ glass, and doped with $GeO_2$. Its $GeO_2$ concentration is on the order of 0.3 mol % to 30 mol %. Doping with $GeO_2$ can cause the silica glass pipe 20 to have a refractive index higher than that of pure $SiO_2$ glass. The following table summarizes differences caused by $GeO_2$ concentrations in the relative refractive index difference $\Delta n_p=(n_p-n_{st})/n_{st}$ of the silica glass pipe 20 with reference to pure $SiO_2$ glass, where the refractive index of the silica glass pipe 20 is $n_p$.

| $GeO_2$ Concentration | Relative refractive index difference $\Delta n_p$ |
|---|---|
| 11 mol % | 1.1% |
| 12 mol % | 1.2% |
| 15 mol % | 1.5% |

The method of preparing the silica glass pipe 20 will be explained later. Here, steps S1 and S2 may be carried out in the reverse order or in parallel separately from each other.

Figure 3C:
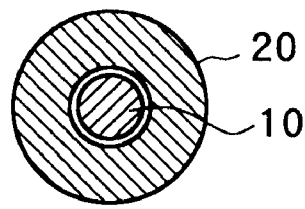

At step S3, as shown in FIG. 3C, the silica glass rod 10 is inserted into the silica glass pipe 20. Here, it does not matter if a gap is formed between the silica glass pipe 20 and the silica glass rod 10. Nevertheless, for obtaining an optical fiber in which the ellipticity of the center core region 11 is low, the gap is preferably as small as possible. Before the insertion, one or both of the silica glass pipe 20 and the silica glass rod 10 may be heated to elongate until an appropriate diameter is attained, or one or both of the inner peripheral surface of the silica glass pipe 20 and the outer peripheral surface of the silica glass rod 10 may be surface-treated with an HF solution. Here, in the case where the silica glass rod 10 is elongated by heating with an oxygen/hydrogen flame, the surface treatment with the HF solution is essential to removing the moisture adhering to the surface of the silica glass rod 10.

Figure 3D:
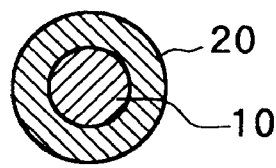

At step S4, the silica glass pipe 20 assembly with the silica glass rod 10 inserted therein at step S3 is heated, so as to be unified as shown in FIG. 3D. This heat-collapsing step is carried out in an atmosphere of $Cl_2$ gas or of a mixed gas of $Cl_2$ and $O_2$.

Figure 3E:
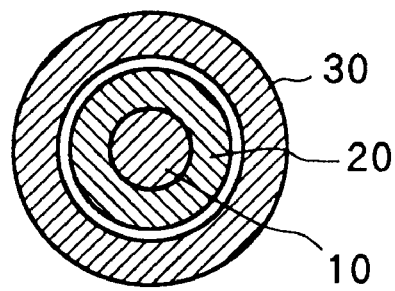

At step S5, the silica glass pipe 20 and the silica glass rod 10 unified by heating at step S4 are inserted into a pure silica glass pipe 30 as shown in FIG. 3E. The pure silica glass pipe 30 is to become the cladding region 13 having a low refractive index in the optical fiber. Before the insertion, the unified silica glass pipe 20 and silica glass rod 10 may be heated to elongate until an appropriate diameter is attained, or the outer peripheral surface thereof may be surface-treated with an HF solution. Here, in the case where the silica glass pipe 20 and silica glass rod 10 unified by heating are elongated with an oxygen/hydrogen flame, the surface treatment with the HF solution is essential to removing the moisture adhering to the surface of the heat-unified silica glass pipe 20 and silica glass rod 10.

Figure 3F:
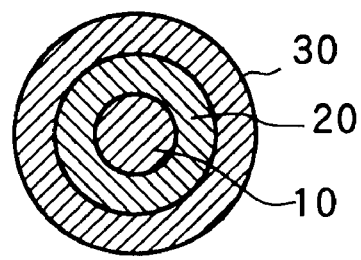

Then, at step S6, the assembly prepared at step S5 by inserting the heat-unified silica glass rod 10 and silica glass pipe 20 into the pure silica glass pipe 30 is heated, so as to be unified as shown in FIG. 3F. Hence, the making of an optical fiber preform is completed. Thus manufactured optical fiber preform has a refractive index profile similar to that of the optical fiber shown in FIG. 1.

According to this optical fiber making method, while a desirable amount of F element is added to the silica glass rod 10 which is to become the center core region having a low refractive index in an optical fiber, no F element is added to the silica glass pipe 20 which is to become the ring core region having a high refractive index in the optical fiber, whereby an optical fiber preform having a refractive index profile of a desirable ring type structure can easily be made.

Next, four embodiments of the method of preparing the silica glass pipe 20 will be explained in the following.

Figure 4:
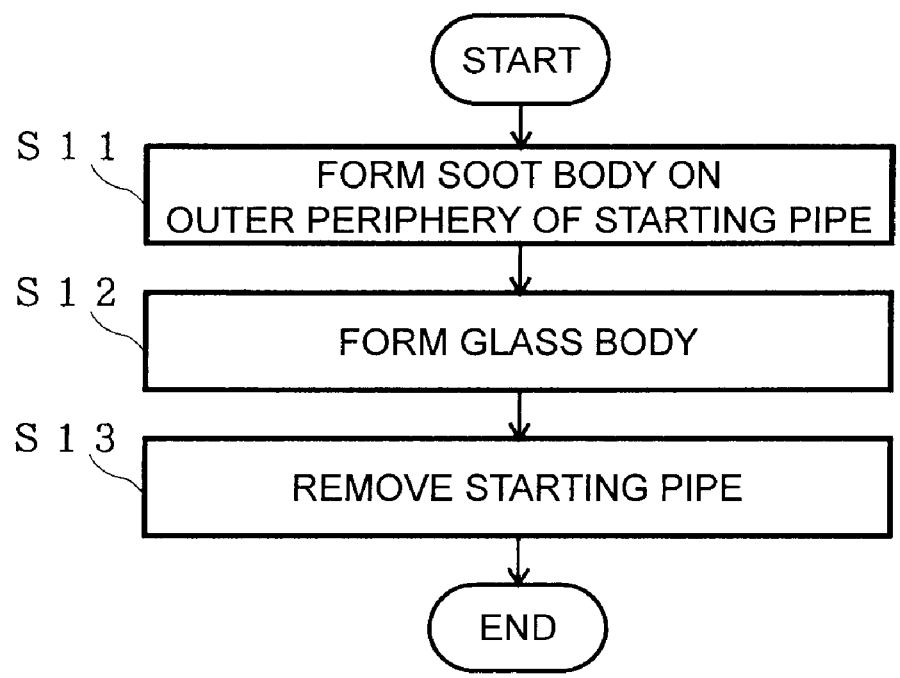
FIG. 4 is a flowchart for explaining a first embodiment of the method of preparing a silica glass pipe.

A first embodiment of the method of preparing the silica glass pipe 20 is as follows. FIG. 4 is a flowchart for explaining the first embodiment, whereas FIGS. 5A to 5C are transverse sectional views of the silica glass pipe 20 at the respective times when the individual steps in the first embodiment are terminated.

Figure 5A:
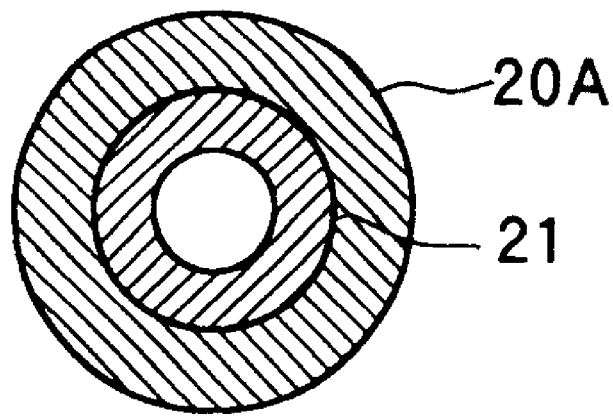
FIGS. 5A to 5C are transverse sectional views of the silica glass pipe at the respective times when the individual steps in FIG. 4 are terminated.
Figure 5B:
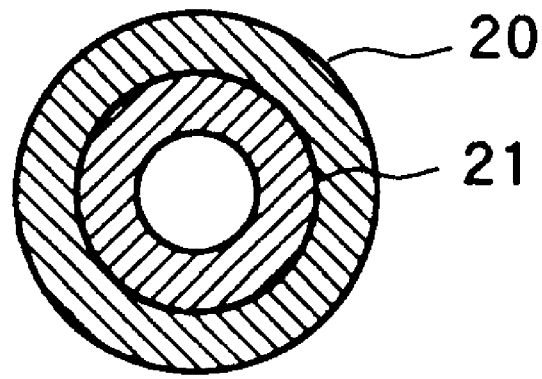
Figure 5C:
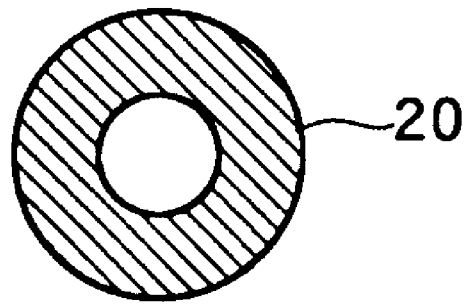

To begin with, at step S11, as shown in FIG. 5A, a silica glass pipe having an inside diameter of 10 mm and an outside diameter of 20 mm, for example, is employed as a starting pipe 21, and a soot body 20A made of $GeO_2$ and $SiO_2$ is formed on the outer peripheral surface of the starting pipe 21 by VAD method. Subsequently, at step S12, it is dehydrated and consolidated so as to form a transparent glass body as shown in FIG. 5B, which is then heated to elongate. Further, at step S13, the portion of the starting pipe 21 in the transparent glass body is removed by being dissolved with an HF solution having a concentration of 5% to 50% or by vapour-phase etching with $SF_6$ gas or the like, so as to prepare the silica glass pipe 20 having an inside diameter of 12 mm, an outside diameter of 24 mm, and a length of 300 mm as shown in FIG. 5C.

Here, with a silica glass pipe employed as a starting pipe, a soot body made of $GeO_2$ and $SiO_2$ may be synthesized on the inner peripheral surface of the starting pipe, so as to form transparent glass, and the outer periphery may be cut by about several mm from the surface thereof so as to remove the part mixed with OH group, thus leaving the silica glass pipe 20. In this case, it is not necessary to remove the whole starting pipe, and the remaining starting pipe portion becomes the cladding region 13.

Figure 6:
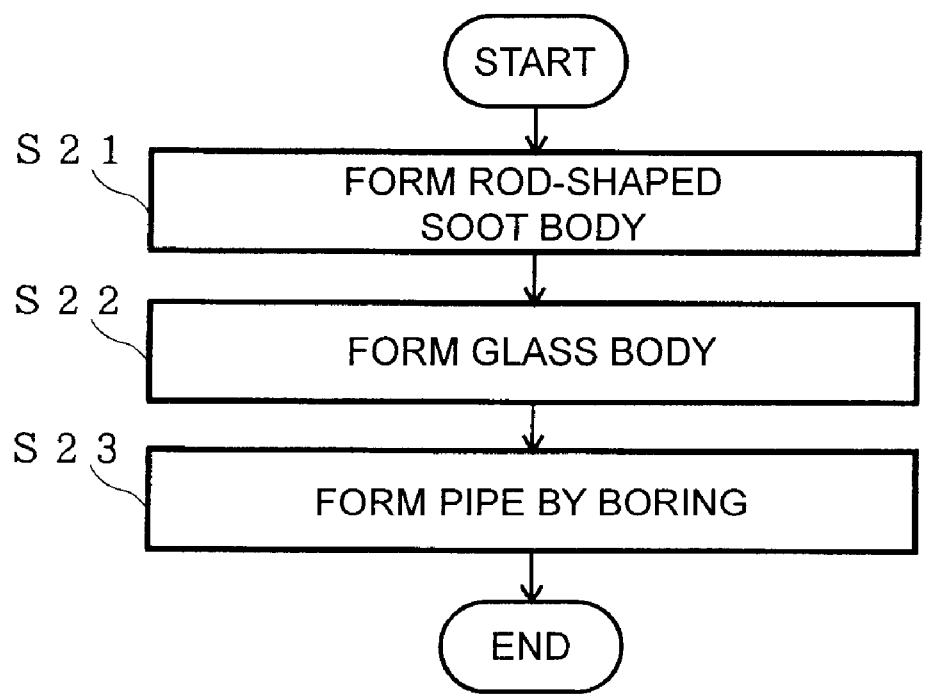
FIG. 6 is a flowchart for explaining a second embodiment of the method of preparing a silica glass pipe.

A second embodiment of the method of preparing the silica glass pipe 20 is as follows. FIG. 6 is a flowchart for explaining the second embodiment, whereas FIGS. 7A to 7C are transverse sectional views of the silica glass pipe 20 at the respective times when the individual steps in the second embodiment are terminated.

Figure 7A:
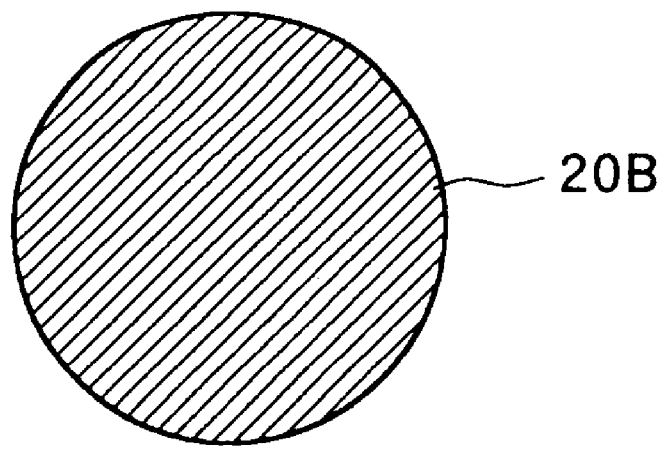
FIGS. 7A to 7C are transverse sectional views of the silica glass pipe at the respective times when the individual steps in FIG. 6 are terminated.
Figure 7B:
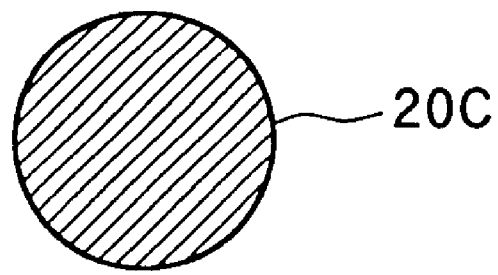
Figure 7C:
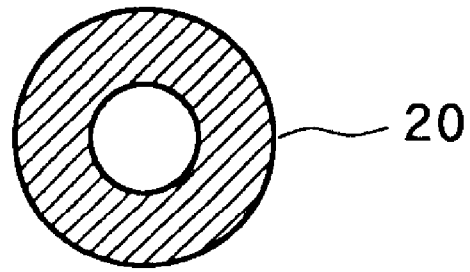

To begin with, at step S21, a rod-shaped soot body 20B having, for example, an outside diameter of 40 mm and a length of 300 mm, made of $GeO_2$ and $SiO_2$, such as the one shown in FIG. 7A, is formed by VAD method. Subsequently, at step S22, it is dehydrated and consolidated so as to form a transparent glass body 20C such as the one shown in FIG. 7B. Further, at step S23, an ultrasonic borer or the like is used to bore the transparent glass body 20C along its center axis, so as to form a hole having an inside diameter of 10 mm, thereby yielding a pipe, which is then heated to elongate, thus preparing the silica glass pipe 20 having an inside diameter of 6 mm and an outside diameter of 24 mm as shown in FIG. 7C.

A third embodiment of the method of preparing the silica glass pipe 20 is as follows. FIG. 8 is a flowchart for explaining the third embodiment, whereas FIGS. 9A to 9D are transverse sectional views of the silica glass pipe 20 at the respective times when the individual steps in the third embodiment are terminated.

Figure 9A:
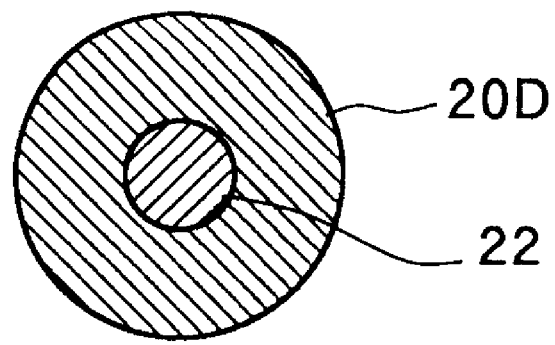
FIGS. 9A to 9D are transverse sectional views of the silica glass pipe at the respective times when the individual steps in FIG. 8 are terminated.
Figure 9B:
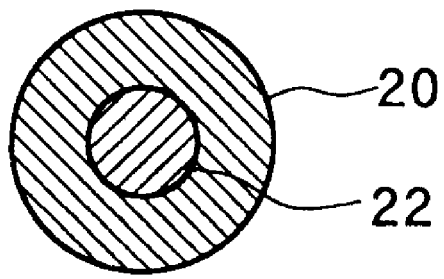
Figure 9C:
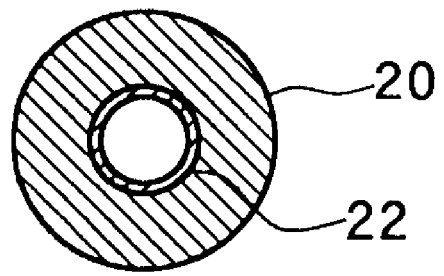
Figure 9D:
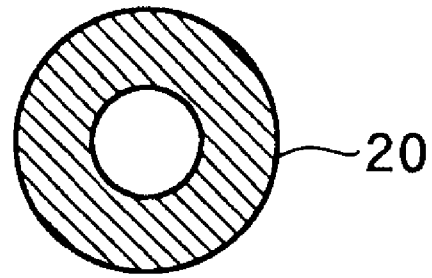

To begin with, at step S31, a starting rod 22 is prepared, and a soot body 20D made of $GeO_2$ and $SiO_2$ is formed on the outer peripheral surface of the starting rod 22 by VAD method as shown in FIG. 9A. Subsequently, at step S32, it is dehydrated and consolidated so as to form a transparent glass body as shown in FIG. 9B. At step S33, an ultrasonic borer or the like is used so as to bore the portion of the starting rod 22 in the transparent glass body along its center, so as to form a hole having an inside diameter slightly smaller than the outside diameter of the starting rod 22, thereby forming a pipe as shown in FIG. 9C. At step S34, the remaining part of the starting pipe 22 in the transparent glass body is removed as shown in FIG. 9D by being dissolved with an HF solution having a concentration of 5% to 50% or by vapour-phase etching with $SF_6$ gas or the like. Thus, the silica glass pipe 20 is prepared.

Figure 10:
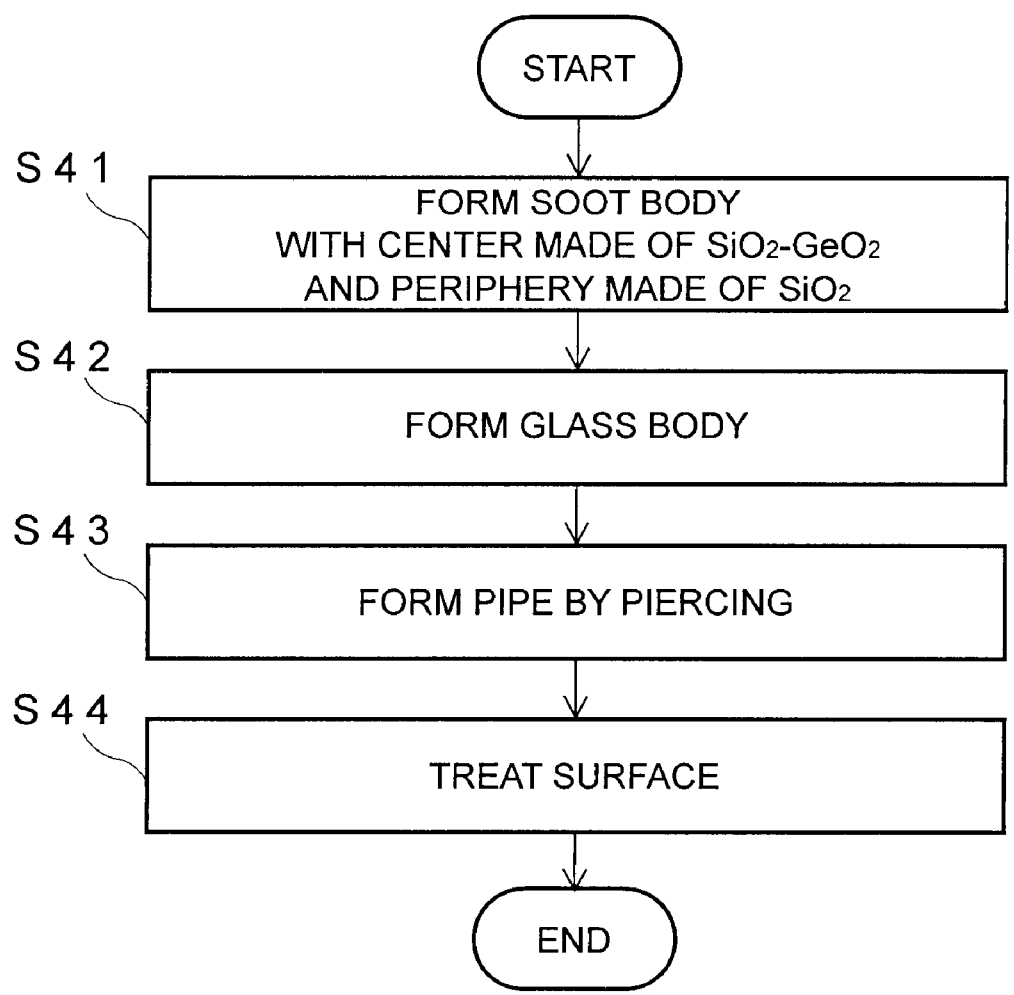
FIG. 10 is a flowchart for explaining a fourth embodiment of the method of preparing a silica glass pipe.

A fourth embodiment of the method of preparing the silica glass pipe 20 is as follows. FIG. 10 is a flowchart for explaining the fourth embodiment, whereas FIGS. 11A to 11D are longitudinal sectional views of the silica glass pipe 20 at the respective times when the individual steps in the fourth embodiment are terminated.

Figure 11A:
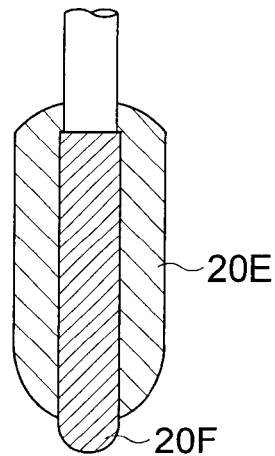
FIGS. 11A to 11D are longitudinal sectional views of the silica glass pipe at the respective times when the individual steps in FIG. 10 are terminated.
Figure 11B:
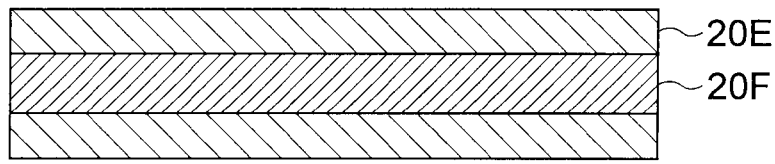
Figure 11C:
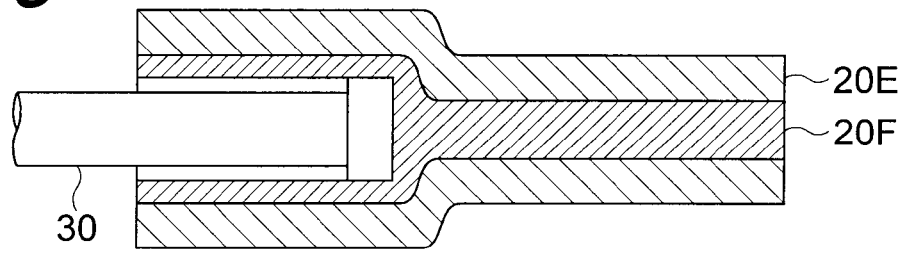
Figure 11D:
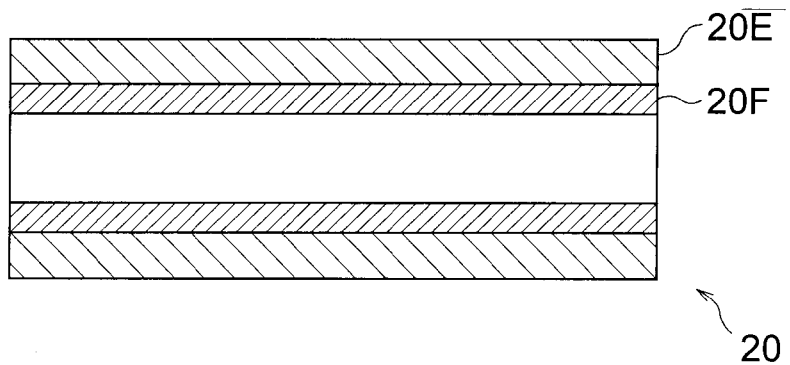

To begin with, a soot body is formed as shown in FIG. 11A at step S41 by VAD method in the same manner as the synthesizing of a soot body for single-mode fiber, and is further heated at step S42 so as to become transparent glass, thereby yielding a silica glass rod having a region 20F (which becomes a ring core region 12) doped with $GeO_2$ in the vicinity of the axial center of a pipe-shaped silica glass region 20E as shown in FIG. 11B. At step S43, this glass rod is heated to at least 1500 °C., which is a softening temperature slightly lower than the melting point, in an inactive gas atmosphere, and then a rod 30 made of a heat-resistant material such as tungsten, alumina, or carbon, for example, is inserted therein along its center axis as shown in FIG. 11, so as to plastically deform the glass rod, thereby forming an opening along the center axis (piercing), thus yielding a silica glass pipe such as the one shown in FIG. 11D. At step S44, the surface of this silica glass pipe is smoothed by removing at least 10 μm of the inner peripheral surface upon being dissolved with an HF solution having a concentration of 5% to 50%, or upon heating the silica glass pipe to 1000 °C. or higher and then treating it by vapour-phase etching with $SF_6$ gas or the like. Hence, the silica glass pipe 20 having an inner surface roughness of 10 μm or less is obtained after the treatment. Here, instead of carrying out steps S41 and S42, a glass layer of $SiO_2$—$GeO_2$ may be deposited on the inner peripheral surface of a silica glass pipe by MCVD method, and the rod 30 may be inserted into this pipe so as to enlarge the opening.

The inventors produced various glass pipes according to the fourth embodiment of the glass pipe preparing method by using various glass pipes of FIG. 11B in which the outside diameter ranges from 20 mm to 150 mm and the ratio of outside diameter of portion 20E/outside diameter of portion 20F ranges from 1.1 to 20. As a result, it has been confirmed that, in thus obtained hollow glass pipes, the eccentricity ((maximum thickness−minimum thickness)/outside diameter) is less than 1%, the outside diameter fluctuation of the region 20F in the longitudinal direction is 5% or less, the ellipticity of each of the inside diameter and outside diameter is 1% or less, and the hollow glass pipes can be produced with a favorable precision.

Next, the results of evaluation of various characteristics of an optical fiber obtained by drawing an optical fiber preform manufactured according to the optical fiber preform making method in accordance with the present invention will be explained.

Here, to be used as the silica glass rod 10, one having an F element concentration of 1.1 wt % and a relative refractive index difference $\Delta n^-$ of −0.4% was elongated to yield an outside diameter of 8.5 mm by heating with an electric furnace and then processed to have an outside diameter of 8 mm with an HF solution having a concentration of 10%. The silica glass pipe 20 was one prepared according to the above-mentioned first embodiment, having a $GeO_2$ concentration of 12 mol %, a relative refractive index difference $\Delta n^+$ of 1.2%, an inside diameter of 12 mm, and an outside diameter of 24 mm. In a state where the silica glass rod 10 was inserted into the silica glass pipe 20, they were heated in an atmosphere of $Cl_2$ gas or of a mixed gas of $Cl_2$ gas and $O_2$ gas, so as to be unified. The rod made by thus unified silica glass rod 10 and silica glass pipe 20 was heated so as to elongate to have an outside diameter of 10 mm, and then was surface-treated with an HF solution so as to yield an outside diameter of 6.2 mm. It was inserted into a pure silica glass pipe 30, and heated so as to be unified, whereby an optical fiber preform was made. Then, this optical fiber preform was drawn, so as to yield an optical fiber having an outside diameter of 125 μm.

The outside diameter 2a of the core region of thus obtained optical fiber was 4.9 μm, whereas the outside diameter 2b of its ring core region was 7.5 μm. Various characteristics of this optical fiber were as follows. The transmission loss at a wavelength of 1550 nm was 0.21 dB/km, mode field diameter was 7.4 μm, zero-dispersion wavelength was 1580 nm, wavelength dispersion slope was 0.088 $ps/nm^2/km$, effective cross-sectional area was 86 $\mu m^2$, bending loss at a diameter of 20 mm was 0.02 dB/m, and polarization mode dispersion was 0.08 $ps/km^{1/2}$. Hence, a dispersion-shifted optical fiber having a zero-dispersion wavelength in the vicinity of 1.55 μm, small transmission loss and bending loss, and a large effective cross-sectional area was obtained. Namely, it has been confirmed that an optical fiber having excellent characteristics, which is not prone to generate nonlinear optical phenomena, can favorably be prepared from an optical fiber preform manufactured by use of the method of making an optical fiber preform in accordance with the present invention.

Figure 12A:
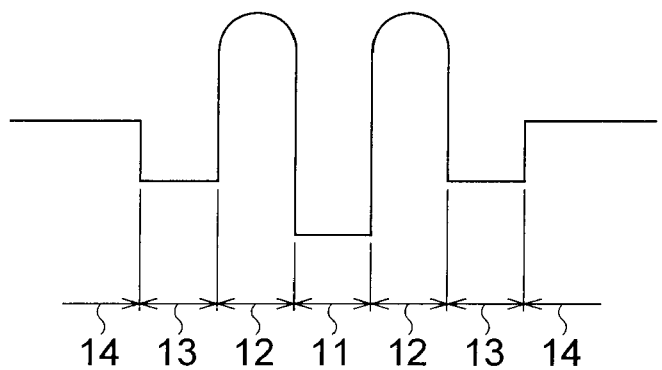
FIGS. 12A to 12D and 13A to 13C are views for explaining other refractive index profiles of the optical fiber preform favorably manufactured by the optical fiber preform making method in accordance with the present invention.
Figure 12B:
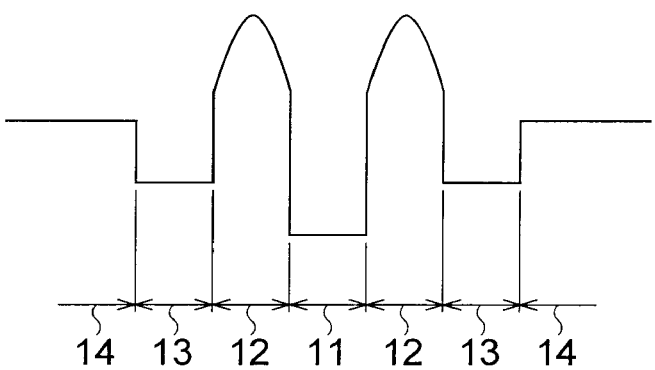
Figure 12C:
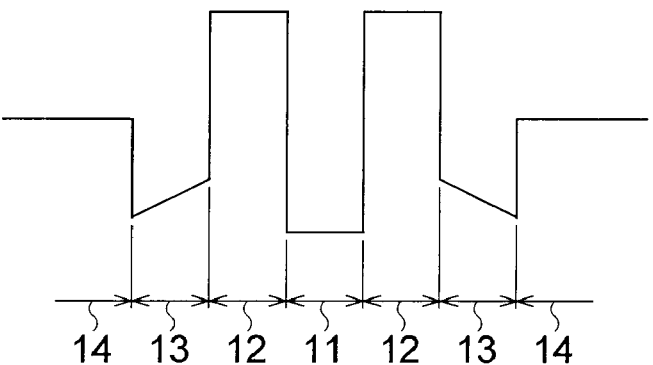
Figure 12D:
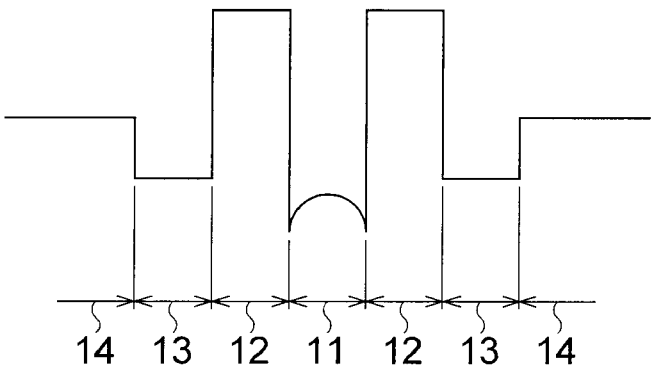

Without being restricted to the above-mentioned embodiments, the present invention can be modified in various manners. The refractive index profile of the optical fiber preform manufactured by the method of making an optical fiber preform in accordance with the present invention, i.e., the refractive index profile of the optical fiber manufactured by use of this optical fiber preform is not limited to that shown in FIG. 1. FIGS. 12A to 12D show other refractive index profiles of the optical fiber preform which can favorably be prepared by the method of making an optical fiber preform in accordance with the present invention, respectively. For example, as shown in FIGS. 12A and 12B, the refractive index profile of the ring core region 12 may vary diametrically instead of being uniform. Such a ring core region 12 can be formed by synthesizing a soot body while changing the ratio between $GeO_2$ and $SiO_2$ when manufacturing the silica glass pipe 20 according to the above-mentioned first to fourth embodiment. Also, as shown in FIG. 12C, the refractive index profile of the inner cladding region 13 may vary diametrically instead of being uniform. An optical fiber preform having such a refractive index distribution can be made by synthesizing a soot body made of $GeO_2$ and $SiO_2$ on the inner surface of a silica glass tube having such a refractive index distribution. Further, as shown in FIG. 12D, the refractive index of the center core region 11 may diametrically change like a curve. For making an optical fiber preform having such a center core region 11, it will be sufficient if a glass rod having such a refractive index distribution is used as the silica glass rod 10.

Figure 13A:
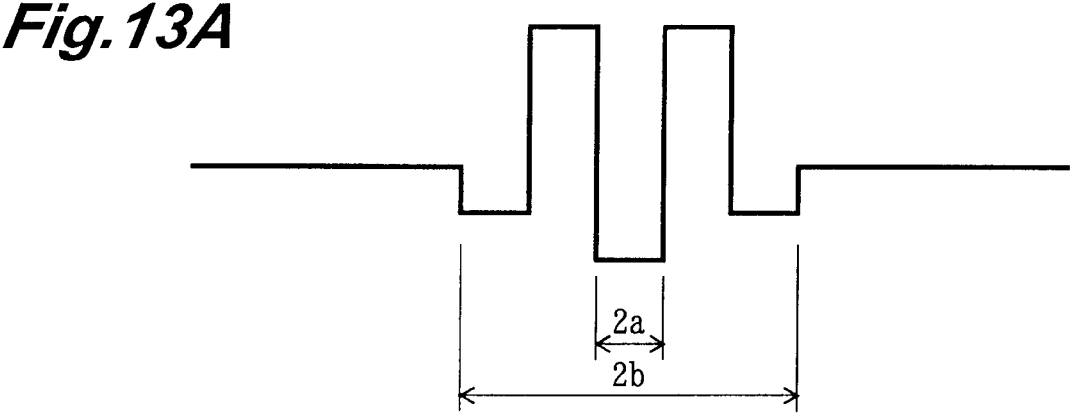
Figure 13B:
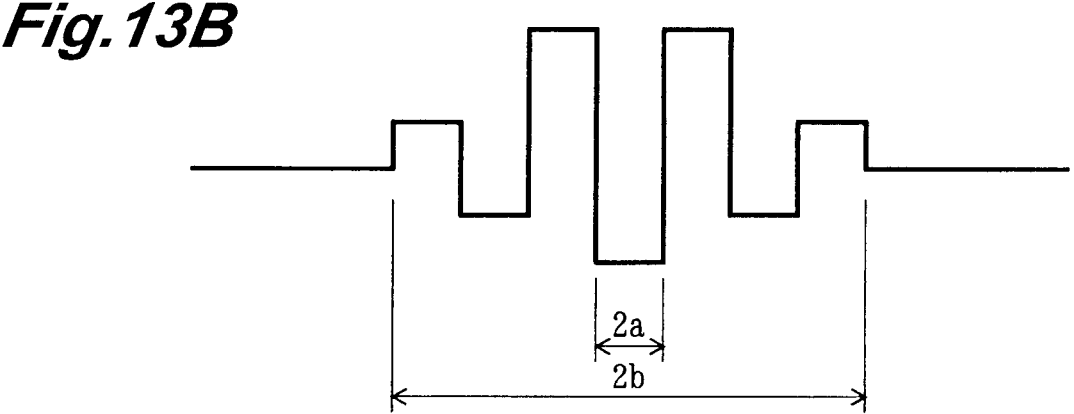
Figure 13C:
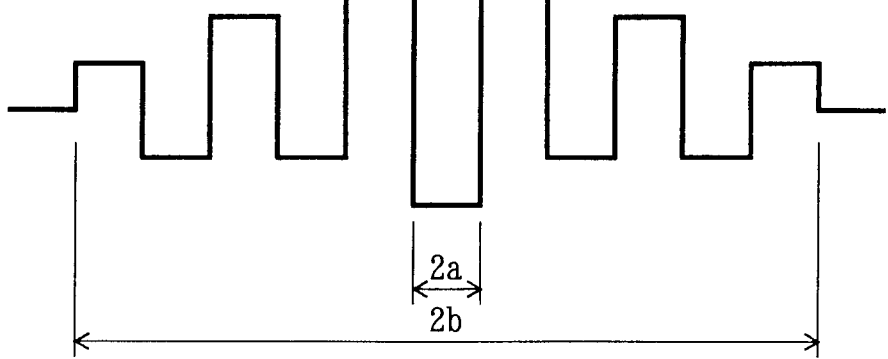

Further, not only one ring core region 12 as shown in FIGS. 1 and 13A, but also a plurality of layers of ring core regions may be disposed as shown in FIGS. 13B and 13C. Optical fiber preforms having any of these refractive index profiles can favorably be manufactured by the optical fiber preform making method in accordance with the present invention. For making an optical fiber preform having such a refractive index profile, a silica glass pipe with an inside diameter of 2a and an outside diameter of 2b having its corresponding refractive index profile is used. For preparing the silica glass pipe 20 having such a refractive index profile, it will be sufficient if a soot body is deposited and synthesized while the mixing ratio of $GeO_2$, $SiO_2$, and F element is changed such that the concentrations of $GeO_2$ is increased when a region which is required to have a higher refractive index is formed and F element is increased when a region which is required to have a lower refractive index is formed.

INDUSTRIAL APPLICABILITY

In accordance with the present invention, an optical fiber preform having a refractive index profile of a desirable ring type structure can easily be manufactured. As a consequence, an optical fiber made therefrom by drawing can also obtain a desirable refractive index profile, without its ring portion being doped with $GeO_2$ in excess, the transmission loss of the optical fiber is small, and nonlinear optical phenomena are hard to occur. In particular, the present invention is favorably applicable to the making of an optical fiber preform for preparing a dispersion-shifted optical fiber.

What is claimed is:

1. A method of making an optical fiber perform for dispersion-shifted optical fiber having a center core portion and ring core portion surrounding said center core portion and having higher refractive index than said center core portion comprising:

a soot body synthesizing step of synthesizing a rod-shaped soot body of $GeO_2$ and $SiO_2$;

a transparent glass forming step of dehydrating and consolidating said soot body so as to form a transparent glass body having a refractive index difference relative to pure silica glass within the range of 0.2 to 1.5%;

a pipe forming step of heating said transparent glass body to a softening temperature or higher and inserting a rod having a melting point higher than said softening temperature into said transparent glass body along the center axis thereof so as to prepare a glass pipe for said ring core portion;

an insertion step of inserting a silica glass rod for said center core portion having a cylindrical form doped with F element having a refractive index difference relative to pure silica glass within the range of −1.0 to 0.0% inside said glass pipe; and a heat-collapsing step of heating and collapsing said glass pipe and said silica glass rod which are in an inserted state brought into by said insertion step.

2. A method of making an optical fiber perform according to claim 1, further comprising:

a surface treatment step of smoothing the inner peripheral surface of said glass pipe by etching with an HF solution or $SF_6$ gas before said insertion step.

* * * * *